(12) United States Patent
Göttinger et al.

(10) Patent No.: US 9,539,766 B2
(45) Date of Patent: Jan. 10, 2017

(54) DEVICE AND METHOD FOR PRODUCING FIBER PREFORMS (71) Applicant: Voith Patent GmbH, Heidenheim (DE)

(72) Inventors: Marco Göttinger, München (DE); Michael Kaiser, München (DE)

(73) Assignee: Voith Patent GmbH, Heidenheim (DE)

( * ) Notice: Subject to any disclaimer, the term of this patent is extended or adjusted under 35 U.S.C. 154(b) by 467 days.

(21) Appl. No.: 14/048,551

(22) Filed: Oct. 8, 2013

(65) Prior Publication Data

US 2014/0035195 A1     Feb. 6, 2014

Related U.S. Application Data (63) Continuation of application No. PCT/EP2012/051293, filed on Jan. 27, 2012.

(30) Foreign Application Priority Data

Apr. 8, 2011   (DE) .......................... 10 2011 007 020

(51) Int. Cl.
*B29C 70/02*      (2006.01)
*B29B 11/16*      (2006.01)
*B29C 70/38*      (2006.01)
*B29C 70/54*      (2006.01)
*B29C 70/56*      (2006.01)
*B29C 70/20*      (2006.01)

(52) U.S. Cl.
CPC .............. *B29C 70/02* (2013.01); *B29B 11/16* (2013.01); *B29C 70/382* (2013.01); *B29C 70/541* (2013.01); *B29C 70/56* (2013.01); *B29C 70/207* (2013.01); *B29C 70/545* (2013.01)

(58) Field of Classification Search
CPC ..................................................... B29C 70/384
USPC .......................................................... 425/521
See application file for complete search history.

(56) References Cited

U.S. PATENT DOCUMENTS 2,934,317 A    5/1954   Warnken
7,758,946 B2   7/2010   Maki et al.
(Continued)

FOREIGN PATENT DOCUMENTS

CN     2885551 Y        4/2007
DE     199 22 799 A1   11/2000
(Continued)

OTHER PUBLICATIONS

Notice of Transfer of International Research Report and the Written Notice Issued for International Searching Authority or Statement dated Apr. 27, 2012 for International Application No. PCT/EP2012/051293 (13 pages).

*Primary Examiner* — Michael N Orlando
*Assistant Examiner* — Kimberly A Stewart
(74) *Attorney, Agent, or Firm* — Taylor IP, P.C.

(57) ABSTRACT

A device for producing fiber preforms includes a plurality of unwind stations, a plurality of grippers and at least one first molding tool. Each gripper is movable on a path between a maximum position and a pick-up position. The pick-up position is provided at a thread transfer point and is closer to the unwind station than the maximum position. The first molding tool has a draping position in the region of the connecting lines between the maximum position and the thread transfer points, and a starting position outside the connecting lines. A thread tension control for the threads or rovings is provided.

16 Claims, 9 Drawing Sheets (56) References Cited

U.S. PATENT DOCUMENTS

| | | | |
|---|---|---|---|
| 8,116,899 B1* | 2/2012 | Johnson | B29C 70/56 19/240 |
| 8,578,995 B2 | 11/2013 | Nelson | |
| 2004/0043196 A1* | 3/2004 | Willden | B29C 43/12 428/174 |
| 2007/0044897 A1* | 3/2007 | Hoffmann | B29C 53/8016 156/157 |
| 2008/0202691 A1 | 8/2008 | Hamlyn et al. | |
| 2011/0000608 A1 | 1/2011 | Bech | |
| 2012/0186730 A1 | 7/2012 | Shindo et al. | |
| 2014/0035195 A1 | 2/2014 | Göttinger et al. | |

FOREIGN PATENT DOCUMENTS

| | | |
|---|---|---|
| DE | 10 2008 011 658 A1 | 9/2009 |
| DE | 10 2008 042 574 A1 | 4/2010 |
| DE | 10 2009 042 384 A1 | 4/2011 |
| JP | 60-34832 A | 2/1985 |
| JP | 2007-283586 A | 11/2007 |

* cited by examiner

DEVICE AND METHOD FOR PRODUCING FIBER PREFORMS

CROSS REFERENCE TO RELATED APPLICATIONS

This is a continuation of PCT application No. PCT/EP2012/051293, entitled "DEVICE AND METHOD FOR PRODUCING FIBER PREFORMS, WHICH ARE A PRECURSOR IN THE PRODUCTION OF FIBER-REINFORCED PLASTIC COMPONENTS IN PARTICULAR", filed Jan. 27, 2012, which is incorporated herein by reference.

BACKGROUND OF THE INVENTION

1. Field of the Invention

The present invention relates to a device for producing fiber preforms which, for example, are a precursor in the production of fiber reinforced plastic components. The present invention moreover relates to a method for producing fiber preforms which are, for example, a precursor in the production of fiber reinforced plastic components using a device according to the present invention.

2. Description of the Related Art

Fiber reinforced plastic consists of a matrix material which, among other factors provides the stiffness, and of fibers which are embedded into the matrix material and which, among other factors provide the tensile strength. Fiber reinforced plastic is used in particular for highly stressed components which nevertheless need to be as light as possible. Since the fibers do not provide strength in the transverse direction, the fibers must be oriented such that their longitudinal direction conforms as closely as possible to the respective load direction. In order to achieve this, the fibers must often be laid in different directions. The better and more precisely the positioning of the fibers is adapted to the load, the better the component will be. There are numerous production methods for fiber reinforced plastic components. Methods which are particularly appropriate for the production of large quantities are however currently only available for rotationally symmetrical or plate-shaped or respectively line-shaped components through winding or plate-pressing or respectively extrusion.

In contrast, more complex high-grade 3-D structures can only be produced at high cost, since production of the required fiber preforms is difficult, slow and expensive. High grade structures are generally produced from continuous fibers. In many processes, fiber preforms, are initially produced according to the desired three-dimensional component shape—so-called preforms—which consist predominantly of fibers which are often arranged in several layers on top of one another to achieve the necessary fiber orientation. Afterwards, the fiber preforms are impregnated or coated with the matrix material, sometimes also pressed and finally cured. For the production of the fiber preforms, as well as for impregnation and/or curing of the components, molding tools according to the desired component shape can be used onto or into which the fiber preform or the component is placed and/or pressed.

So that the fiber preforms possess sufficient dimensional stability for further processing, they are provided with small amounts of adhesives or binding agents and, following the three-dimensional draping are fixed, for example by means of drying or heating and cooling.

The fiber preforms are usually created through placing on top of one another and fixing of prefabricated and pre-joined flat semi-finished products. Such semi-finished products are, for example tapes or fabrics, laid thread structures or nonwovens, wherein a multitude of individual threads or rovings are already woven, sewn or agglutinated into a flat fabric. One refers to "thread" in the use of so-called continuous fibers, in other words if the fibers are unwound from a spool or from a ball of thread. Numerous threads which are unwound untwisted simultaneously from a spool or a ball of thread are referred to as a thread bundle or roving. The rovings can hereby consist of several tens of thousands of individual threads which are also referred to as filaments.

The required individual parts are cut to size according to a type of pattern from a flat semi-finished product which is usually available in the form of a roll product, as is known from DE 10 2008 011 658 A1. Then they are placed over a molding tool and joined with each other or pressed together. One example for the production of such semi-finished products by means of agglutination or sewing is also given in DE 10 2008 011 658 A1. In spite of everything however, a large amount of manual actions are often necessary. A device for machine production of simple single-dimensional curved preforms with sections of semi-finished product which are pre-stored in a cartridge and are then deposited on a core, is known from DE 10 2008 042 574 A1. More complex forms cannot yet be produced by machine.

Another possibility for producing fiber preforms for more complex components is automated fiber placement. Here, narrow thread bundles or ribbons from thread bundles guided back and forth over the molding tool by a fiber placement head, and are thereby placed adjacent and on top of one another on the molding tool, pressed onto it and fixed. For more complex components, an expensive robotic control of the fiber placement head is necessary. Even when using two, three or even four parallel fiber placement heads the production speed is still relatively slow, since the heads often have to travel long distances and since they are working successively with narrow fiber bundles. Moreover, they have a very long and complicated thread-tracking from the creel to the multi-axial moving placement head. Such thread-tracking in flexible tubes with special guide blades to prevent turning of the rovings is shown, for example in U.S. Patent Application Publication No. 2008/0202691 A1.

What is needed in the art is a device and a method for production of fiber preforms, so that also more complex high grade structures can be more easily automated, and manufactured faster and cheaper, however remaining flexible in shape and thread orientation.

SUMMARY OF THE INVENTION

The present invention provides a device including a plurality of unwind stations for the provision of a plurality of threads or rovings, a plurality of grippers which respectively can grip individual or a plurality of threads or rovings at their origin, and at least one first molding tool. Each gripper is movable on a path between a maximum position and a pick-up position, wherein the pick-up position is provided at a thread transfer point and is closer to the unwind station than the maximum position.

More specifically, the present invention provides a device including a first molding tool that has a draping position in the region of the connecting lines between the maximum position and the thread transfer points, and a starting position outside the connecting lines. A thread tension control for the threads or rovings is also provided.

When the molding tool moves into the tensioned thread or roving layer, the threads are deflected by the molding tool, thus the thread tension would change without being controlled. By providing a control, the thread tension can be controlled during the production process and, in particular, also during draping. This is important since the threads or rovings must not be overburdened, but on the other hand should also not be positioned too loosely in order to obtain optimum component rigidity. In contrast, when using flat semi-finished products the fibers can only be applied largely without tension. And, in placement with a fiber placement head, the thread must be deposited according to the three-dimensionality of the shape with precisely calculated excess length in the embodiment of loops or such, so that the threads then have the tensioned length during draping, that is when the molding tools are brought in or together. By controlling the thread tensions, the normally necessary calculation of the placement paths which is complicated and time consuming can be foregone. The production process becomes thereby simpler and faster, can occur parallelized, and can moreover be adapted flexibly to various component shapes. Especially in batch production of strongly three-dimensional fiber preforms the advantages pay off. The thread tensioning control is important even if a plurality of grippers, during tensioning of the threads or rovings, are located in different intermediate positions, for example near or along one outer contour of a molding tool. The result later on is only a very small amount of scrap of expensive fibrous material. However, the severe deflections of the threads or rovings occurring due to this can only be controlled by controlling the thread tensions. In connection with simple, for example linear paths for the grippers, simple thread guidance with low friction is also achieved. Thus, a plurality of threads or rovings can simultaneously be tensioned quickly and controlled adjacent to each other. The device is thereby configured such that it is capable of placing threads or roving material at rates of more than 2 kilograms per minute (kg/min) or even more than 3 kg/min. Moreover, the unwind stations, as well as the thread guides, can remain stationary due to the grippers.

Since the otherwise customary flat semi-finished products are being foregone and instead the fiber preform is draped and produced directly from threads or rovings, material costs compared to known methods are much lower. A short production time can nevertheless be achieved through parallelization. The flat semi-finished products are quite expensive because of prefabrication. With strongly three-dimensional components there is the additional risk of wrinkling when using large area semi-finished products. In small area components on the other hand, the expenditure for cutting and joining of the individual components increases.

Advantageously a second molding tool is provided which can be brought together with the first molding tool in the draping position and which has its own starting position. Thus, also more complicated three-dimensional shapes can be produced in that a group of threads or rovings is draped or respectively reshaped between the two molding tools. Viewed from the first molding tool, the second molding tool is, for example, arranged on the opposite side of the tensioned threads or rovings. The movement into the draping position can occur for the second molding tool, for example, simultaneously with, or after the first molding tool. It can however also occur before the first molding tool. Obviously, a multi-part configuration of the molding tools is also possible, for example so that larger or more complex molding tools can be assembled.

The second molding tool may be in the embodiment of a hood which fits over the first molding tool and whereby a gap remains for the threads or rovings between the first and second molding tool. Due to the fact that the threads or rovings are forced into a gap between the molding tools, a more precise shape can be achieved.

For effective draping it is helpful if the direction of movement between the starting position and the draping position of the first and/or second molding tool is substantially perpendicular to the paths of the grippers. A deviation of up to approximately +/−30° is however conceivable. The paths of the grippers are, for example, approximately horizontal and the direction of movement of the molding tool approximately vertical. For both directions a deviation of up to +/−30° is also conceivable. The paths of the grippers, for example, coincide approximately with the tensioned threads or rovings before draping.

The control for thread tensioning is, for example, configured such that the thread tensions during movement of the first and/or second molding tool can be kept substantially constant, in particular to values which are present at the start of the movement and further to a uniform value. The thread tension control is thereby simple and optimum strength characteristics of the fiber preform or respectively the subsequent component are achieved.

Moreover it is advantageous to allocate at least one device for measuring the respective thread tensions to each unwind station or each group of unwind stations which are arranged in the region of the thread transfer point and/or between the unwind station and the thread transfer point and which is, for example, in the embodiment of a ring force transducer at a point of deflection. This ensures that each thread or roving bundle has a controlled thread tension, and can accordingly be controlled individually or in small groups.

A plurality of unwind stations, for example a maximum of ten or a maximum of six, can be combined into a group which has only one thread tension control. In order to be sufficiently flexible as least, there should be at least as many unwind stations or group of unwind stations as there are grippers.

The device will function especially flexibly and with little scrap if the grippers are able to assume different individual intermediate positions on their path and can firmly hold the respective origins of the threads or rovings at these intermediate positions. This enables different shapes to be reproduced. And, only the amount of thread is tensioned by each gripper as is required for the respective location of the shape. It is further possible for the intermediate positions to be arranged near and along one outer contour of one of the molding tools, so that when severing the threads or rovings only a small amount of scrap occurs.

For example at least 5 grippers, at least 10 grippers, or at least 20 grippers are provided. In order to be able to produce larger components with sufficient adaptation to the respective shape, it is helpful if the grippers have a clamping width of between approximately 10-500 millimeters (mm), or between approximately 20-200 mm, and/or if all grippers provide a total clamping width of at least 1 meter (m), of at least 2 m, or of at least 3 m.

Advantageously, each unwind station or group of unwind stations has its own clutch and/or braking device assigned to it. The thread tensions can moreover be controlled individually for each unwind station. Thus, a common drive on the unwind stations or the thread transfer points can be provided for release of the threads. The individual clutch- and/or braking devices then control the corresponding thread tensions or respectively separate or connect the drive with the threads.

The individual unwind stations can moreover be configured such, that they respectively can release different lengths of thread, for example during movement of the first and/or a second molding tool. This enables also more complicated shapes to be created more precisely.

Moreover it is helpful if also the first and/or second molding tool is rotatable and/or tiltable at least in the starting position and if it can be moved in rotated and/or tilted position into the draping position. The axis of rotation of the first and/or second molding tool is positioned, for example, substantially perpendicular to the paths and substantially parallel to the direction of movement between the starting position and the draping position of the first and/or second molding tool. The desired orientation of the layer in regard to the final component can be achieved through rotation of the molding tool. Thus, a very flexible arrangement of the fiber preforms, and nevertheless a simple automation without complicated calculations of the thread travel paths is possible.

In order to make a simple and flexible adaptation to various component shapes possible, the first and/or second molding tool can be attached to a motion device, so as to be easily detachable, for example on a lifting table or a lowering device. Thus, one or several layers of threads or rovings can be passed on, together with a molding tool to a subsequent and in particular to an again inventively arranged device, in order to place one or more additional layers there.

The supply of the device with threads or rovings occurs from the unwind stations. The unwind stations may for example be in the embodiment of so-called creels. The threads or rovings can hereby be drawn from the spools or balls of thread (bobbins). Each thread transfer point receives threads or rovings from one or a plurality unwinding stations. A separating device which can separate the threads or rovings between a molding tool and the grippers, and/or a separating device which can separate the threads or rovings between one molding tool and the thread transfer points can also be provided.

One spreader device or a plurality of spreader devices may be provided in the region of the thread transfer points or between thread transfer points and a molding tool which ensures that the threads or rovings are positioned adjacent to each other, covering as much area as possible and do not slip sideways even during subsequent draping. A spreader device of this type may be configured for example as a kind of comb having one or more rows of tines.

The first and/or second molding tool can moreover be equipped with a heating device and/or a pressing unit. A binder already present in the layer can be activated through temperature or pressure increase, so that the threads or rovings are fixed in the predetermined shape and are initially joined into a layer and then into the fiber preform. Binder materials, for example threads or fleeces which consist at least partially of thermoplastic or adhesive can be draped at the same time. Thus, the binder material necessary for fixing is applied at the same time with the fibrous material. The binder material may also be introduced by hybrid threads containing binder material in addition to fibrous material, or by coating or spraying of the threads or rovings. The binder material may also be applied after draping of the threads and rovings over a molding tool, for example by spraying. Fixing of one layer of threads or rovings provides certain stability for the placement of an additional layer of threads or rovings, or for further processing of the fiber preform.

The present invention also provides a method for using the inventive device for making fiber preforms. The method generally includes the following successive steps:
    tensioning of threads or rovings with the assistance of a plurality of grippers;
    draping of the threads or rovings over the first forming tool; and
    severing the threads or rovings.

More specifically, the present invention provides a method wherein the draping always occurs through the first molding tool travelling into the region of the tensioned threads or rovings, and the thread tensions of the threads or rovings can be adjusted during the travelling motion. The thread tensions may be regulated to a value of between 1 and 50 Newton per meter squared ($N/m^2$). The advantages of the present invention have already been discussed for the device and apply also to the method.

For example, a second molding tool, such as a hood, which can be brought together with the first molding tool is used for draping, and the thread tensions may be regulated also during the movement of the second molding tool.

Draping is to be understood to be the reshaping of, or respectively creating a shape with the threads or rovings with the assistance of a molding tool. Draping can occur in one or in several steps.

Moreover, the thread tensions can be kept substantially constant during draping, for example at the values existing at the beginning of the draping process, and further at a uniform value. This means that during tensioning of the threads or rovings for one layer the thread tensions are brought to a desired value, for example all to the same value and are then kept constant during draping or respectively reshaping.

It is also advantageous if the thread tensions are measured in the region of the thread transfer points and/or between the unwind stations and the thread transfer points and if threads or rovings are released at the individual unwind stations and/or the individual thread transfer points for adjustment of the controlled thread tensions. Thread is thereby released precisely where it is needed for draping. The adjustment relates, for example, to the measured value of the thread tensions at the aforementioned locations.

At the individual unwind stations and/or at the individual thread transfer points different amounts of thread or roving can be released, in particular to adapt to the three-dimensional shape of the first and/or second molding tool.

It can also be advantageous that the respective gripper is displaced such that the thread tensions adjust. This may be done alternatively or in addition to the adjustment of the thread tensions via releasing of threads or rovings.

For completion or further processing of the fiber preforms it may be advantageous if after and/or during draping, the threads or rovings are fixed dimensionally stable, for example by activation of binder material which, for example has already been applied together with the threads or rovings. This occurs for example through heating and/or pressing. Fixing can occur separately on each layer and/or after the last layer.

After draping and after or during fixing the threads or rovings are severed between molding tool and gripper and/or between molding tool and thread transfer point. Only very little scrap fiber material remains on the grippers. The fiber material between molding tool and thread transfer point can be rewound and continue to be used.

Provision may be made in batch production that the method for placement of a plurality of layers of threads or rovings on the first molding tool is implemented several times successively. This may occur inside an inventive device or, after placement and fixing of the one layer, the molding tool is moved on into one or a plurality of inventive devices wherein respectively an additional layer or threads or rovings is placed according to the inventive method.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1a-7b illustrate an embodiment of the inventive device in various process steps and FIGS. 8a-c illustrate an additional embodiment of the inventive device, showing different process steps.

FIG. 1a is a side view of a gripper of a first embodiment of the inventive device capturing threads or rovings according to the present invention;

FIG. 1b is a top view of gripper capturing threads or rovings according to the invention illustrated in FIG. 1a;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Referring now to the drawings, and more particularly to FIGS. 1a-7b, there is shown an embodiment of the present inventive device in various process steps. The inventive device is capable of carrying out the following process steps sequentially or partially parallel to one another:

provision of threads or rovings and possibly the binder material;
gripping the required threads or rovings and possibly the binder material;
tensioning of the required threads or rovings by positioning the grippers accordingly;
first draping over a first molding tool;
second draping with a second molding tool;
fixing the layer of threads or rovings;
severing of threads or rovings on both sides of the molding tools;
rewinding the released and unused threads or rovings;
opening the molding tooling tools; and
rotating and/or passing forward a molding tool with the applied layer.

Repeat of the sequence is feasible for placement of additional layers in the same device or in one or a plurality of additional inventive devices, to completion of the fiber preform.

Fibers, for example of carbon, glass, or aramid, or other fibers can be used as the fiber material for the threads or rovings. Thermoplastics or thermosetting plastics, epoxy resin, other plastics (polymers), or other resin may be considered as a matrix material for the fiber-reinforced plastic. The binder material can be thermoplastic or adhesive. It can either already be present as a hybrid thread or hybrid chloride roving, meaning that individual fibers or threads consist of binder material, or it can be with tensioned together with the threads or rovings by the gripper, or it is applied or sprayed onto the draped threads or rovings.

The basic structure of the inventive device is shown in FIGS. 1a and 1b. The provision of the threads or rovings occurs via a plurality of unwind stations in which the fiber material is provided in the form of spools or balls of thread (so-called bobbins), and which are arranged in several rows 1, 2 next to each other, behind one another or above one another. The spools can also form an upper and a lower row as shown in FIG. 1a. The origins of the threads or rovings 20 are shown schematically only in the respectively used region for the used unwind stations 3, 4. All other origins are also threaded to the corresponding thread transfer points 14 so that they can be captured by the associated grippers in pick-up positions 9. Collectively this is also referred to as creel.

On the other side grippers 5 are shown in their maximum positions 8, which in this case also correspond to the initial positions. The clamping width of a gripper is b, and the total clamping width of all grippers is B. Even if only grippers having equal widths are illustrated, grippers having different widths are of course possible. The grippers do not necessarily have to have their maximum and pick-up positions in one line. Moreover, a first molding tool 15 is illustrated on a lifting table 17, and a second molding tool 16 which is configured as a hood is shown in a starting position—in other words outside the paths of the grippers. The second molding tool is not shown in the top view. And a corresponding moving or lowering device for the second molding tool is also not specifically shown. Moreover a binder material supply 19 is provided which can be arranged for example, between the rows of unwind stations.

One gripper 6 is positioned in the pick-up position and fetches the threads or rovings corresponding to its position in the device by grasping their origins. The gripper is movable using a guide device 7, for example a rod assembly or a piston. The grippers can move individually, however only linearly and on parallel paths adjacent to each other, between pick-up and maximum position. Thus a simple automation and a fast parallel movement is possible. As illustrated, several unwind stations can be combined into a group and be allocated to one gripper. One gripper can grasp multiple threads or rovings together. In any event, at least as many unwind stations as there are grippers should be provided.

Referring now to FIGS. 2a and 2b there is illustrated tensioned threads or rovings 21, which gripper 10 has withdrawn through its movement into its intermediate position. This can be assisted by actively driven unwinding. The intermediate position is located close to the outer contour of the molding tools or respectively near the subsequent position of the outer contour, when the molding tools are brought into their draping position. Binding material 18, for example in the form of binder threads or binder fleeces, can also be tensioned by the gripper together with the threads or rovings. As illustrated, the arrangement may include an upper and a lower row of unwind stations, so that the binder material is tensioned between the upper and the lower group of threads or rovings. During pulling out, the binder material can be pre-activated in the region of thread transfer points 14, for example by a heating device, so that the threads or rovings are already somewhat fixed to each other in the region of thread transfer points 14, immediately at the beginning of the draping process. Furthermore, a spreader device may be provided in the region of the thread transfer points which may be configured as a kind of comb having one or more rows of tines. This ensures that the threads or roving are positioned adjacent to each other and do not slip sideways even during subsequent draping. The spreader device may also be displaceable along the thread paths or along the gripper paths. Shown also is a possibility for a thread tensioning measuring device 13.

Draping is to be understood to be the reshaping or forming into a shape the threads or rovings using a molding tool. Draping may occur in one or more stages in that the molding tool or tools are moved simultaneously or consecutively in the layer of the tensioned threads or rovings. During the draping process it is advantageous to regulate the thread tensions, for example to keep them constant. This means that the amount of threads or rovings is released as is necessary for draping at the respective position of the molding tool. To be able to achieve this, brake and clutch devices can be provided. For example, appropriate controls are assigned to each unwind station or each group of unwind stations. This prevents the threads or rovings becoming overburdened or being laid too loosely. The thread tensions can also be measured by suitable measuring devices in the region of the thread transfer points and/or between the unwind stations and the thread transfer points. For example, the value of the thread tensions is between 1 and 50 N/m$^2$.

Referring now to FIGS. 3a and 3b, there is illustrated the condition after the first draping. Molding tool 15' is moved from lifting table 17 into the draping position. The threads or rovings 22 are thereby deflected and draped over molding tool 15'. Gripper 10 secures the beginning of the threads near the outer contour of molding tool 15'. After this step, binder material may be applied or sprayed on the threads or rovings, alternatively or additionally.

In the next step the threads or rovings are further draped or reshaped using second molding tool 16' which has been moved to its draping position. (FIGS. 4a and 4b). Through the interaction of the two molding tools, between which the layer of threads or rovings is located, accurate shaping is possible. The molding tools can also be pressed together, and one, for example the second, or both of the molding tools may be heated so that the binder material is activated and the threads or rovings are fixed to a dimensionally stable layer. Simultaneously with or after fixing, the threads or rovings are cut at both sides of the molding tools, in other words between the gripper and molding tool and between thread transfer points and the molding tool. In one embodiment the separating device may be connected with the first or second molding tool. It is advantageous, when the separation occurs at least on the side of the thread transfer positions close to the molding tool. This creates only a small amount of scrap of expensive fiber material and less rework of the fiber preform is necessary.

The severed threads or rovings 23 may be retracted and rewound or stored temporarily by a suitable thread guide. Rewinding occurs in such a way that the beginnings of the threads or rovings in the thread transfer points 14 are again positioned so that they can be picked up by the grippers without too much scrap material being created. To detect the beginnings, sensors can be used.

Referring now to FIGS. 5a and 5b, the threads or rovings are already rewound or cut off at the thread transfer point, so that beginnings are located again at the thread transfer points. Only a small amount of scrap 24 fiber material is generated at the grippers, as they were positioned respectively closely to and along the outer contour of the molding tooling tools and tensioned only as much thread as was needed. Molding tools 15, 16 are returned to their starting position. The first formed layer 25 remains on the first molding tool.

FIGS. 6a and 6b illustrate first and second molding tools 15, 16 in a rotated position. Here they were rotated by 90°. However, a different angle of rotation of approximately 30°, 45°, 60°, or tilting is also possible. The angle of rotation may, for example, be between 10 and 170°. This depends on how and with what fiber orientation the additional layer of threads or rovings is to be placed. Required grippers 6' are in the pick-up position in order to grip beginnings 20 of the used threads or rovings. Then, the threads or rovings of the additional layer are tensioned to an intermediate position of the grippers, and draped in that the first and the second molding tools 15', 16' are moved into the draping position.

FIGS. 7a and 7b show the device after the threads or rovings were severed. Used grippers 11 are in an intermediate position. In the case of non-rectangular molding tools or other angles of rotation, grippers 11 may also be in different intermediate positions. The additional layer of threads or roving, and possibly of binder material may also be fixed dimensionally stable in its shape and joined with the first layer by heating and/or pressing. Together they form fiber preform 28.

Figure 1:
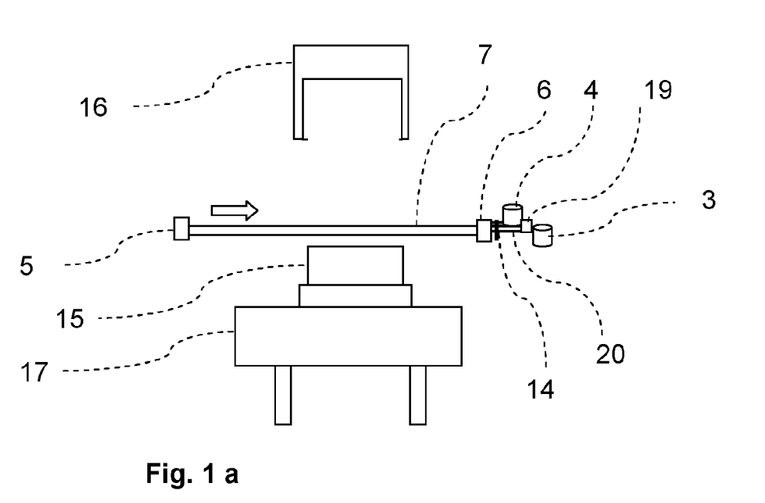
Figure 2:
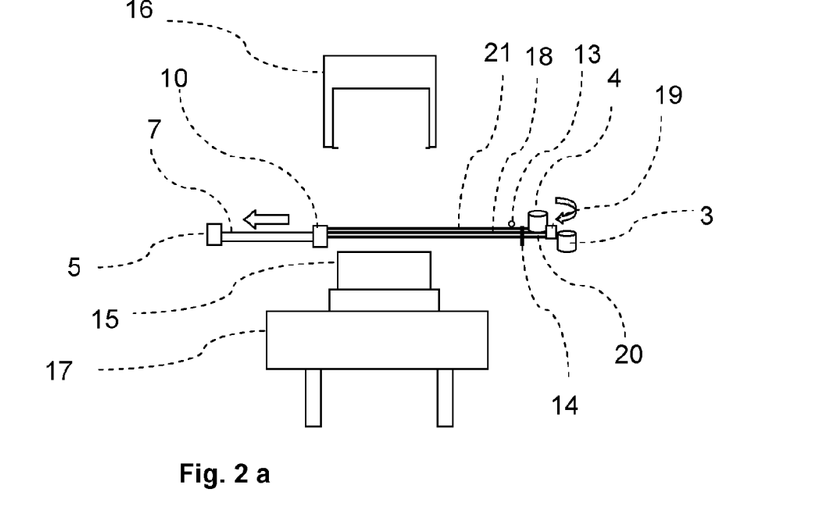
FIG. 2a is a side view of the device of FIG. 1a after tensioning the threads or rovings.
FIG. 2b is a top view of the device of FIG. 1a after tensioning the threads or roving.
Figure 3:
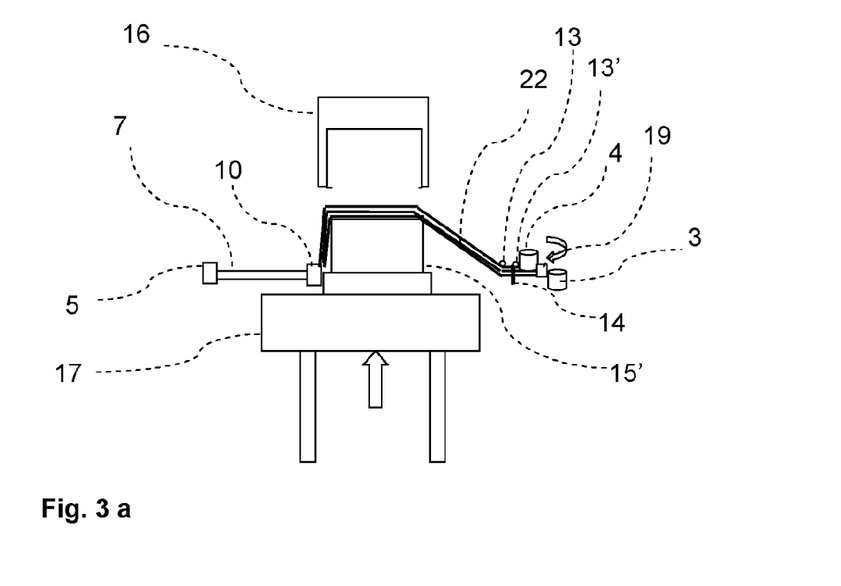
FIG. 3a is a side view of the device of FIG. 1a after a first draping step of a first layer.
FIG. 3b is a top view of the device of FIG. 1a after a first draping step of the first layer.
Figure 4:
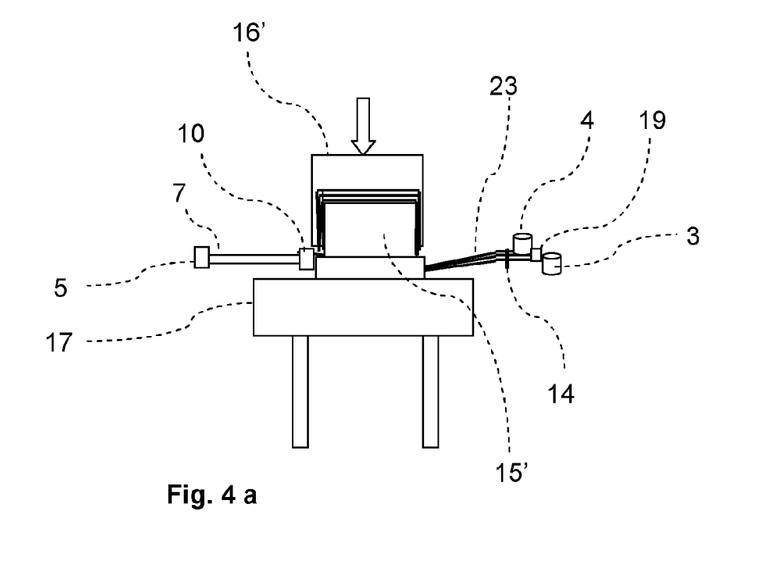
FIG. 4a is a side view of the device of FIG. 1a after a second draping step of the first layer.
FIG. 4b is a top view of the device of FIG. 1a after a second draping step of the first layer.
Figure 5:
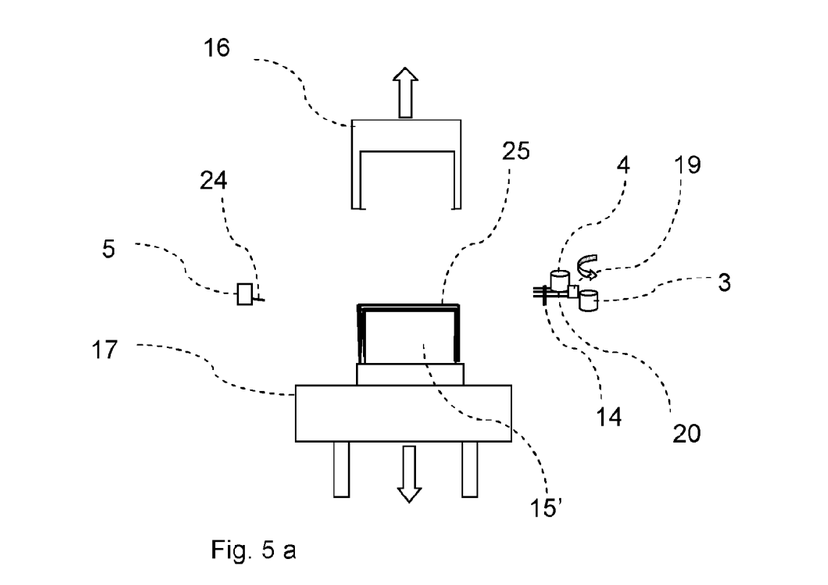
FIG. 5a is a side view of the device of FIG. 1a after severing of threads or rovings.
FIG. 5b is a top view of the device of FIG. 1a after severing of threads or rovings.
Figure 6:
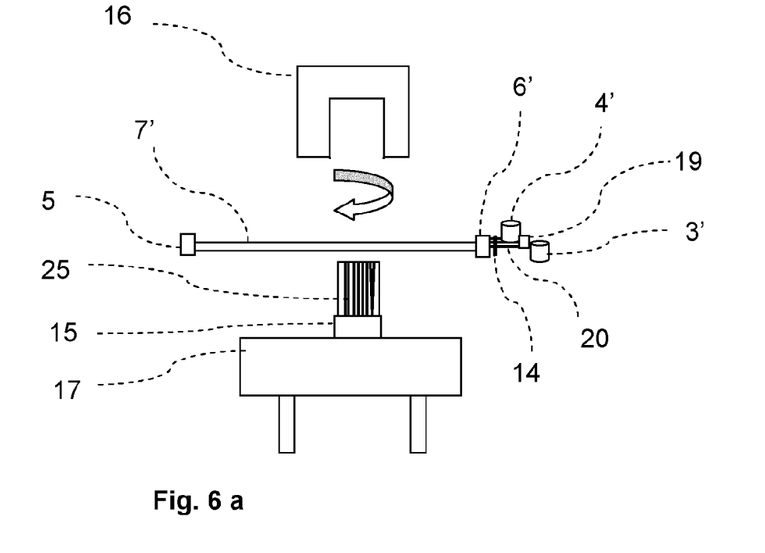
FIG. 6a is a side view of the device of FIG. 1a after turning of molding tools, and gripper picking up threads or rovings for the second layer.
FIG. 6b is a top view of the device of FIG. 1a after rotating molding tools, and gripper picking up threads or rovings for the second layer.
Figure 7:
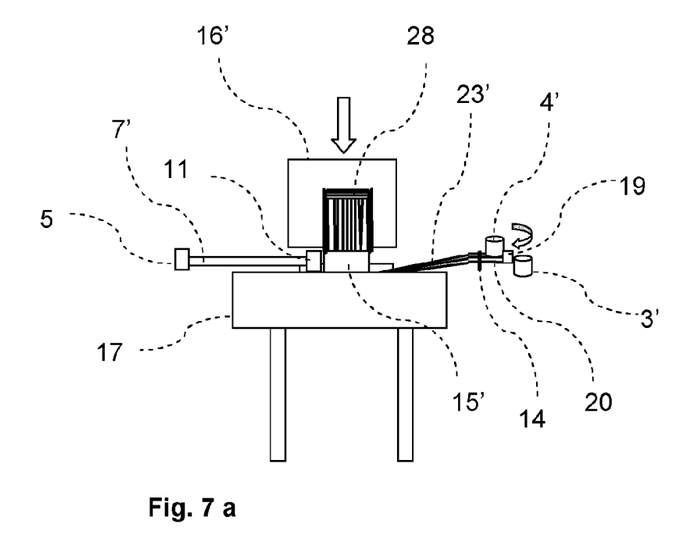
FIG. 7a is a side view of the device of FIG. 1a after a second draping step of the second layer.
FIG. 7b is a top view of the device of FIG. 1a after a second draping step of the second layer.
Figure 8:
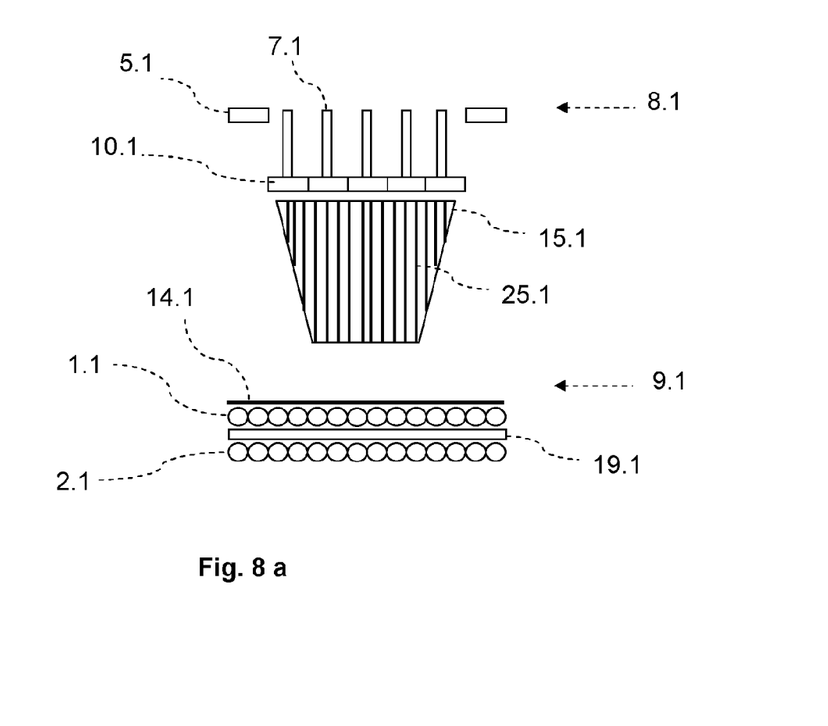
FIG. 8a is a top view of a second embodiment of the inventive device after placement of the first layer.
FIG. 8b is a top view of the device of FIG. 8a after placement of an additional layer.
FIG. 8c is a top view of the device of FIG. 8a after placement of yet another layer.

Referring now to FIG. 8a, there is illustrated an additional embodiment, as used for example in the manufacture of fiber preforms for engine hoods. Used grippers 10.1 are at an intermediate position, the unused grippers 5.1 are in the maximum position 8.1. On first molding tool 15.1, a first layer of threads or rovings is draped and fixed. The second molding tool is not illustrated. The supply of the threads or rovings occurs in unwind station 1.1, 2.1. Moreover, a binder material supply 19.1 is available at thread transfer points 14.1, which are positioned adjacent pick-up position 9.1.

Placement of one or several additional layers can occur in the same device, or in one or a plurality of other devices according to the present invention, to which the first molding tool 15.1 is transferred along with the first layer 25.1. In FIG. 8b an additional layer 26.1 is draped on the rotated molding tool. For the sake of clarity only a few threads or rovings are shown. The used grippers 11.1 are positioned along the outer contour of the molding tool, thereby defining it as precisely as possible. For even more precise adaptation, narrower or wider grippers can be used.

Referring now to FIG. 8c, there is shown placement of yet another layer. Used grippers 12.1 are positioned again along the outer contour. Fixing the layers 25.1, 26.1, 27.1 together create the fiber preform 28.1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1, 1.1, 2, 2.1 rows of unwind stations
3, 3', 4, 4' unwind stations in use
5, 5.1 row of grippers
6, 6' grippers in pick-up position
7, 7.1, 7', 7.1' guide device for grippers
8, 8.1 location of the maximum positions
9, 9.1 location of pick-up positions
10, 10.1, 11, 11.1, 12, 12.1 grippers in intermediate positions
13, 13' measuring device for thread tension
14, 14.1 thread transfer points (possibly also with spreading device and/or device for binder pre-activation)
15 first molding tool in start position
15', 15.1 first molding tool in draping position
16 second molding tool in start position
16' second molding tool in draping position
17 lift table
18 binder material
19, 19.1 binder material supply
20, 20' beginnings of threads or rovings
21 tensioned threads or rovings
22 draped threads or rovings
23, 23' severed threads or rovings
24 scrap
25, 25.1 first layer of threads or rovings
26.1, 27.1 additional layer of threads or rovings
28, 28.1 fiber preform
b clamping width of a gripper
B overall clamping width of all grippers

What is claimed is:

1. A device for producing fiber preforms, the device comprising:
a plurality of unwind stations for providing a plurality of threads or rovings;
a plurality of grippers configured to grip an origin of one of a single of said threads or rovings and a plurality of said threads or rovings, each of said grippers being movable on a path between a maximum position and a pick-up position, each of said plurality of grippers capable of retaining the origins of its respective threads or rovings at a unique position on its path with respect to the remaining grippers, said pick-up position being provided at a thread transfer point and being closer to one of said plurality of unwind stations than said maximum position;
at least one first molding tool having a draping position, the draping position being in a region of said plurality of threads or rovings between said maximum position and said thread transfer points, said first molding tool having a starting position outside said threads or rovings; and
a thread tension control for said plurality of threads or rovings.

2. The device according to claim 1, wherein the fiber preforms are a precursor in the production of a plurality of fiber reinforced plastic components.

3. The device according to claim 1, further comprising a second molding tool configured for being brought together with said first molding tool in said draping position, said second molding tool having a starting position of its own.

4. The device according to claim 3, wherein said second molding tool is a hood which fits over said first molding tool, a gap remaining for said plurality of threads or rovings between said first molding tool and said second molding tool.

5. The device according to claim 1, wherein said thread tension control is configured such that thread tensions are kept substantially constant during movement of at least one of said first molding tool and said second molding tool.

6. The device according to claim 5, wherein said thread tensions are kept at values present at a start of said movement of at least one of said first molding tool and said second molding tool.

7. The device according to claim 6, wherein said thread tensions are kept at a uniform value.

8. The device according to claim 7, wherein at least one device for measuring said respective thread tensions is allocated to one of each of said unwind stations and to each group of said unwind stations, said at least one device for measuring said respective thread tensions being arranged at least one of in a region of said thread transfer point and between said unwind station and said thread transfer point.

9. The device according to claim 8, wherein said at least one device for measuring said thread tensions is a ring force transducer at a point of deflection.

10. The device according to claim 3, wherein during movement of at least one of said first molding tool and said second molding tool, at least some of said plurality of grippers are arranged in an intermediate position between said pick-up position and said maximum position.

11. The device according to claim 1, wherein said plurality of grippers is at least five grippers.

12. The device according to claim 11, wherein said plurality of grippers is at least 10 grippers.

13. The device according to claim 12, wherein said plurality of grippers is at least 20 grippers.

14. The device according to claim 8, wherein each of said unwind stations or group of unwind stations has at least one of a clutch of its own, a braking device assigned to it and is configured for thread tensions to be controlled individually for each said unwind station.

15. The device according to claim 1, wherein said unwind stations are configured to release different lengths of thread.

16. The device according to claim 15, wherein said unwind stations are configured to release said different lengths of thread during movement of at least one of said first molding tool and said second molding tool.

* * * * *